May 13, 1952     J. H. FESSLER     2,596,392
WINE FILTRATION
Filed May 12, 1950
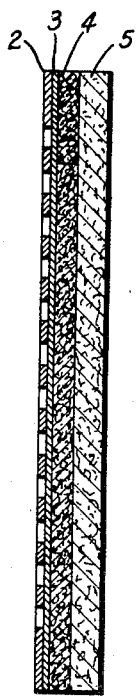
INVENTOR.
JULIUS H. FESSLER
BY    ECKHOFF & SLICK
A MEMBER OF THE FIRM Patented May 13, 1952

2,596,392

UNITED STATES PATENT OFFICE 2,596,392

WINE FILTRATION

Julius H. Fessler, Berkeley, Calif.

Application May 12, 1950, Serial No. 161,718

2 Claims. (Cl. 210—203)

This invention relates to filtration and, more particularly, to the filtration of wine.

One of the quality tests to which wine is subject is that of its brilliance, this being a measure of wine clarity; the presence of finely divided particles, either of microscopic or sub-microscopic size, tends to make the wine turbid, if the concentration of such particles be relatively high, or at lower concentrations, of a dull and lusterless appearance. When the particles are completely absent, the wine is clear and brilliant. If one compares two lots of the same wine, one which has been filtered in accordance with the present invention and one which has been filtered by a typical prior art method and apparatus, the increase in brilliance is readily apparent when the two wines are exhibited in a reasonably strong light, that prepared in accordance with this invention being bright, crystal-clear and of markedly sparkling clarity as compared to the prior art filtered wine.

It has been proposed heretofore to filter wine and to utilize various filter-aid materials such as diatomaceous earth. To prepare a filter for use with such a filter-aid, it is usual to slurry the earth and place it on a support element on the filter such as a screen or a paper sheet placed upon a filter plate. I have found that the filtration of wine is materially improved if one utilizes asbestos, adding this as a pre-coat to the mechanical filter element utilized. The asbestos should be relatively chemically inert to the wine and should be of fibrous nature so that it can be slurried and deposited to form a relatively thick felted mass upon the supporting filter element. In this connection, the asbestos lends itself readily to the formation of such a deposit inasmuch as it tends to deposit where the flow resistance is least so that a uniform layer is built up upon the supporting filter element; on the contrary, diatomaceous earth does not flow where the resistance is least so that it is almost impossible to form a uniform coat with it and the earth is not uniformly deposited upon the supporting filter element, leaving thin and even bare places on the element.

In preparing a plate filter, a mechanical filtering element is placed immediately against the plate; I have used successfully a high wet strength thin paper sheet to hold back asbestos fiber "floaters" which might otherwise pass at least during the initial formation of the pre-coat. A relatively thick filter pad is then placed upon the filter plate such as an Eaton Dikeman Filter Pad No. 320. The asbestos fiber is slurried in wine or water, being stirred for several minutes to ensure that the fiber is wetted by the liquid. The liquid is then circulated through the filter. Knowing the filter plate area, the weight of asbestos utilized is fixed to provide a deposit of a given weight. For example, to secure a filtration rate of approximately 50–60 gallons per hour per square foot of filter area on a plate type filter, it is necessary to use only about ½ ounce per square foot of filter plate area of asbestos. If one ounce of asbestos is employed per square foot of filter area, then the filtration rate is reduced approximately one-half, that is, to 25 to 30 gallons per hour per square foot of filter area. If it is desired to remove sub-microscopic particles and microorganisms from the wine to provide a wine which is sterile as it leaves the filter, it is necessary to employ about 2 ounces per square foot of filter plate area. If the outlet of the filter and the connecting conduits to the bottling machine be sterilized, as by passage of a suitable sterilizing material therethrough (I have successfully used various known quaternary ammonia compounds to sterilize this portion of the equipment), then sterile wine can be provided and further pasteurization of the wine is unnecessary.

In the drawing forming a part of this application, the single figure is a cross-sectional view of a filter made in accordance with the present invention. Referring to the drawing by reference characters, there is shown a filter plate 2, a thin paper sheet 3, a thick fibrous felted paper sheet 4 and a layer of fibrous felted asbestos 5.

While the foregoing is particularly applicable to a plate type filter, the invention is by no means limited in application to such filters and one can use a screen as a supporting medium, the asbestos being pre-coated directly upon the screen. However, in this case, it is necessary to use approximately double the quantities utilized on the plate type filter for a given flow rate and quality; that is, one would use one ounce of asbestos in place of one-half ounce on the plate filter to secure a flow rate of approximately 50–60 gallons per hour, and to secure an equivalent degree of improvements in brilliance.

A further feature of the utilization of the asbestos pre-coat is that it possesses such mechanical strength and resistance to shrinkage that if the filter is shut down for any length of time, as overnight, the pre-coat does not shrink away from the plate and become filled with cracks and crevices, as is the case with other pre-coat materials such as diatomaceous earth.

From the foregoing, I believe it will be apparent that I provide a novel method and apparatus for use in the filtration of wine to the end that the brilliance of the wine can be vastly increased and improved.

I claim:

1. In a filter having a plate, a thin paper sheet on said plate and in contact therewith, a thick fibrous, felted paper sheet having one face thereon in face-to-face engagement with one face of said thin paper sheet, and a layer of fibrous felted asbestos on the other face of said thick fibrous sheet and of a weight of about three ounces per foot of layer area.

2. In a filter having a plate, a thin paper sheet on said plate and in contact therewith, a thick fibrous, felted paper sheet having one face thereon in face-to-face engagement with one face of said thin paper sheet, and a layer of fibrous felted asbestos on the other face of said thick fibrous sheet and of a weight of between about 0.5 and 4.0 ounces per foot of layer area.

JULIUS H. FESSLER.

REFERENCES CITED

The following references are of record in the file of this patent:

UNITED STATES PATENTS

| Number | Name | Date |
|---|---|---|
| 336,799 | Derham | Feb. 23, 1886 |
| 1,764,660 | Sweetland | June 17, 1930 |
| 2,083,887 | Wieneke | June 15, 1937 |

FOREIGN PATENTS

| Number | Country | Date |
|---|---|---|
| 545 | Great Britain | of 1885 |
| 49,961 | Germany | Dec. 10, 1889 |

OTHER REFERENCES

Filtration and Filters, by Pickard, 1929, pages 242–246 and 418.